(12) United States Patent
Williams et al.

(10) Patent No.: US 9,580,527 B2
(45) Date of Patent: *Feb. 28, 2017

(54) DUAL CURE COMPOSITE RESINS CONTAINING URETDIONE AND UNSATURATED SITES

(71) Applicant: Covestro LLC, Pittsburgh, PA (US)

(72) Inventors: Charles Todd Williams, Pittsburgh, PA (US); Joseph G. Pierce, Pittsburgh, PA (US); David P. Zielinski, Wexford, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,656

(22) Filed: Oct. 29, 2015

(65) Prior Publication Data

US 2016/0200857 A1    Jul. 14, 2016

Related U.S. Application Data

(63) Continuation of application No. 13/835,935, filed on Mar. 15, 2013, now Pat. No. 9,175,117.

(51) Int. Cl.

| | | |
|---|---|---|
| C08G 18/32 | (2006.01) | |
| C08G 18/62 | (2006.01) | |
| C08G 18/74 | (2006.01) | |
| C08L 75/04 | (2006.01) | |
| C08F 124/00 | (2006.01) | |
| C08K 7/02 | (2006.01) | |
| C08K 7/06 | (2006.01) | |
| C08K 7/10 | (2006.01) | |
| C08L 37/00 | (2006.01) | |
| C08L 45/00 | (2006.01) | |
| C08L 67/00 | (2006.01) | |
| C08G 18/34 | (2006.01) | |
| C09D 133/14 | (2006.01) | |
| C09D 175/04 | (2006.01) | |
| C08G 18/67 | (2006.01) | |
| C08G 18/78 | (2006.01) | |
| C08G 18/79 | (2006.01) | |
| C09D 175/16 | (2006.01) | |
| C09D 4/00 | (2006.01) | |
| C08J 3/24 | (2006.01) | |
| C08J 5/24 | (2006.01) | |

(52) U.S. Cl.
CPC ........ *C08F 124/00* (2013.01); *C08G 18/3206* (2013.01); *C08G 18/3215* (2013.01); *C08G 18/341* (2013.01); *C08G 18/672* (2013.01); *C08G 18/7837* (2013.01); *C08G 18/798* (2013.01); *C08J 3/243* (2013.01); *C08J 5/24* (2013.01); *C08K 7/02* (2013.01); *C08K 7/06* (2013.01); *C08K 7/10* (2013.01); *C08L 37/00* (2013.01); *C08L 45/00* (2013.01); *C08L 67/00* (2013.01); *C09D 4/00* (2013.01); *C09D 133/14* (2013.01); *C09D 175/04* (2013.01); *C09D 175/16* (2013.01); *C08J 2375/04* (2013.01); *C08J 2375/16* (2013.01)

(58) Field of Classification Search
None
See application file for complete search history.

(56) References Cited

U.S. PATENT DOCUMENTS

| | | | |
|---|---|---|---|
| 2,671,082 A | 3/1954 | Stallmann | |
| 3,099,642 A | 7/1963 | Holtschmidt et al. | |
| 3,248,370 A | 4/1966 | Reischl et al. | |
| 3,290,286 A | 12/1966 | Oertel et al. | |
| 4,138,372 A | 2/1979 | Nishikawa et al. | |
| 5,196,457 A | 3/1993 | Wilkinson et al. | |
| 5,648,173 A * | 7/1997 | Blizzard ................. | C09D 4/00 428/446 |
| 5,726,240 A | 3/1998 | Rosthauser et al. | |
| 6,392,001 B1 | 5/2002 | Mertes et al. | |
| 6,777,090 B2 | 8/2004 | Baumgart et al. | |
| 8,058,382 B2 | 11/2011 | Richter et al. | |
| 8,134,014 B2 | 3/2012 | Richter et al. | |
| 8,202,618 B2 | 6/2012 | Weikard et al. | |
| 9,175,117 B2 * | 11/2015 | Williams .............. | C08F 124/00 |
| 2006/0052527 A1 * | 3/2006 | Weikard .............. | C08G 18/672 524/589 |

(Continued)

FOREIGN PATENT DOCUMENTS

| | | |
|---|---|---|
| DE | 2349726 A1 | 4/1975 |
| DE | 3316592 A1 | 11/1984 |
| DE | 4040290 A1 | 7/1992 |

OTHER PUBLICATIONS

Zorll, "Lacke und Druckfarben", Rompp Lexikon Chemie. 1998, p. 491, 10th ed. Georg-Thieme-Verlag, Stuttgart.

Oldring, (Ed.) Chemistry & Technology of UV & EB Formulations for Coating, Inks & Paints, 1991, pp. 123-135, vol. 2, SITA Technology, London.

Laas et al., "Zur Synthese aliphatischer Polyisocyanate—Lackpolyisocyanate mit Biuret-, Isocyanurat- odor Uretdionstruktur", J. Prakt. Chem./Chem., Ztg. 1994, pp. 185-200, vol. 336.

Gryshchuk et al., "Toughening of Vinylester-Urethane Hybrid Resins Through Functionalized Polymers", Journal of Applied Polymer Science, 2002, pp. 672-680, vol. 84.

(Continued)

*Primary Examiner* — Michael J Feely
(74) *Attorney, Agent, or Firm* — John E. Mrozinski, Jr.

(57) ABSTRACT

The present invention provides a dual-cure composition containing multifunctional polyols, uretdiones, peroxide curable monomers containing unsaturation and crosslinking agents. The dual-cure composition may be used to form a high modulus material useful as the matrix in a prepreg material and in composites. The present invention also relates to methods for the production of the dual-cure composition, prepreg materials comprising the dual-cure composition and a fibrous support, and composites made from the prepreg material.

15 Claims, 3 Drawing Sheets

(56) References Cited

U.S. PATENT DOCUMENTS

| | | | |
|---|---|---|---|
| 2007/0240606 A1* | 10/2007 | Kruger | C08G 18/3821 106/31.13 |
| 2008/0265201 A1 | 10/2008 | Spyrou et al. | |
| 2009/0062419 A1* | 3/2009 | Stockel | C08G 18/4252 522/109 |
| 2010/0227942 A1 | 9/2010 | Spyrou et al. | |
| 2012/0003890 A1 | 1/2012 | Schmidt et al. | |

* cited by examiner

Resin area devoid of glass fibers

Cluster of glass fibers

DUAL CURE COMPOSITE RESINS CONTAINING URETDIONE AND UNSATURATED SITES

This application is a continuation of U.S. Ser. No. 13/835,935, now U.S. Pat. No. 9,175,117 issued Nov. 3, 2015.

BACKGROUND OF THE INVENTION

The present invention pertains generally to a dual-cure composition containing uretdione groups and unsaturated sites. More specifically, the invention pertains to compositions containing multifunctional polyols, uretdiones, free radical curable monomers containing unsaturation and crosslinking agents which may be used to form a high modulus material useful in composites and in the production of prepregs.

Fibers or fabrics pre-impregnated with polymer or resin matrices, "prepregs", have become increasingly common in the composite industry as they offer several major advantages. One of the biggest advantages is a greater ease of use. Prepregs arrive as solid preformed sheets which can be stored prior to use in composite parts fabrication. Furthermore, methods of composite parts fabrication using hand layup in an open molding process or infusion into closed molds requires the use of liquid resins, solvents and hardeners which can be time consuming, messy and inefficient. For example, in a hand layup process much of the material is wasted in achieving a proper resin mix, and on the rollers, sprayers and other application equipment used to form the composite part.

Moreover, it is difficult to achieve high fiber or fabric content in a composite part using hand layup methods, with an industry standard being about 40% fiber or fabric. The low fiber content and thus increased resin content increases brittleness and diminishes the overall structural properties of the final fabricated composite part. Prepregs, on the other hand, can provide a near perfect resin content which leads to greatly improved strength properties and a higher volume capacity. Prepregs typically contain 65% or more fabric, leading to improved cure times and increased strength. Furthermore, the optimal resin content of prepregs leads to improved uniformity and repeatability of the final composite part. Without the pitfalls of human lamination techniques, there are neither resin rich nor resin dry spots. Thickness is uniform and every part that comes out of the mold has a theoretical likelihood of being identical.

Another advantage of prepregs is that they allow for the use of a wider range of polymer or resin matrices. The accuracy of the machinery used to produce prepregs enables the use of very tough and strong resin systems that would be too high in viscosity to be impregnated by hand.

Today, prepregs find use in commercial aerospace, military/defense, general aviation, space/satellite, marine, sporting goods, automotive, civil engineering, wind energy and the transportation markets. The wind energy industry, for example, is one of the fastest growing consumers of prepregs in the world as energy from wind power is currently the fastest-growing source of electricity production in the world. Contemporary wind turbines are fitted with three blades, each of which can reach 80 meters in length and weigh as much as 35 tons. These blades are typically 70 to 75% E-glass by weight infused with epoxy or unsaturated polyester resins. In 2011, there were 23,640 new wind turbines built globally. At the current growth rate, U.S. wind energy developers install two new wind farms per week, with tens to hundreds of turbines per farm. As such, an area of intensive research and development has been the quality of the rotor blades that are produced, and less expensive production methods and materials.

It is known that prepregs can be produced from a number of different synthetic polymers or resins and various fibers or fabrics. Glass fibers have proved to be a particularly advantageous reinforcing material. Epoxy, vinyl ester, bismaleimide, cyanate ester, phenolic, polyimide, polyetheramide and polyester resins have been processed with glass fibers to create storable prepregs which can be formed by means of heated presses and hardened to generate composite parts combining high strength with rigidity. This process is, however, attended by several disadvantages which often depend on the matrix material selected.

One shortcoming in the abovementioned prepregs is that they have a relatively short shelf-life. Heat cures prepreg materials and storage at warmer temperatures will reduce their shelf-life. Keeping the material cooler, such as by freezing, may extend the shelf-life significantly but adds another set of problems. Prepregs stored at low temperatures need to be wrapped and sealed in polythene and must be fully thawed before breaking the polythene seal in order to avoid moisture contamination. Epoxy resins, for example, are able to absorb water easily, thus storage conditions and processing methods may be critical to obtaining a uniform composite part.

Another shortcoming is that relatively high heats must be applied to the prepreg material in a mold to cure the polymer or resin and form the final composite part. For each prepreg resin system there is a minimum cure temperature and a range of options for cure temperature and duration. The oven or autoclave, the laminate, and all tooling (molds) need to reach and maintain the given cure temperature throughout the specified cure cycle. Frequently, the cure temperature exceeds the temperature that the fiber materials and/or molding equipment can handle. Bismaleimide resins, for example, are cured at 180° C. for three hours during which time the resin exhibits a low viscosity. A typical cure cycle for cyanate ester resins includes temperatures as high as 260° C. Many fibers and fabrics may not withstand such high cure temperatures and the low viscosity makes the molding process problematic.

Additionally, if the resin material has a high exotherm, the heat generated within the prepreg may exceed the temperatures that the fiber materials and/or molding equipment can withstand leading to a discolored or scorched composite part. As such, polymer or resin matrices with large exotherms may only be used in thin layers to avoid excessive heat build-up. Certain epoxy resin matrix formulations, for example, demonstrate exotherms in excess of 300 J/g which can lead to uncontrolled polymerization and excessive heat formation.

An additional shortcoming is the use of solvents, reactive diluents and other toxic materials in certain polymer or resin matrices. For example, unsaturated polyester resins often require reactive diluents such as styrene during the free radical initiated polymerization reaction (cure). Both solvents and reactive diluents have also traditionally been used to lower the viscosity of matrix materials and thus provide for better fiber wet-out properties and improved ease of handling. Reactive diluents are known to lead to a very high crosslink density which can make the final product extremely brittle and reduce its notched impact strength. Solvents, on the other hand, complicate processing as elaborate measures must be taken to extract the solvent vapors and, in many installations, explosion-proof processing equipment becomes necessary.

Alternative polymer matrices include polyurethanes which use uretdiones as the crosslinking agents. Uretidiones are, in effect, self-blocked isocyanates that provide the desired urethane or allophanate linkages while offering a latent heat induced reactivity without the release of toxic blocking agents. The prior art has recognized the advantages associated with this latent reactivity, but has for the most part failed to make practical application of this concept in prepreg matrix formulations which may be cured at lower temperatures.

By way of illustration, disclosures of the preparation of crosslinkable polyurethane rubbers and elastomers which take advantage of the latent reactivity of the uretdione linkage can be found in U.S. Pat. Nos. 3,099,642 and 3,248,370. The processes described in these references involve combining, at temperatures of less than 100° C., a relatively high molecular weight (e.g., on the order of from 500 to 3,000 daltons) difunctional resin, a low molecular weight crosslinking reagent, and a uretdione diisocyanate, or a mixture of a uretdione diisocyanate and a monomeric diisocyanate. The resulting, essentially thermoplastic, formulations contain an excess of isocyanate reactive groups, and these formulations are finally cured to a crosslinked thermoset polymer by treatment at temperatures in excess of 140° C.

U.S. Pat. No. 4,138,372 discloses a prepreg matrix material comprising epoxy resins which are cured using the latent reactivity of the uretdione linkage. Dissociation of the uretdione ring to isocyanates was found to take place at about 170° C. in the absence of catalysts, while catalysts such as tetraphenyl borate-amine complexes lowered the dissociation temperature to some extent. At the high temperatures used in the aforementioned patents, however, the uretdione ring most often dissociates to form free isocyanates.

Furthermore, because of the environmental and economic requirements imposed on the matrix materials, i.e., that they should use as little organic solvent as possible or none at all, for adjusting the viscosity, there is a desire to use raw materials which are already of low viscosity. Known for this purpose are polyisocyanates with an allophanate structure as are described in U.S. Pat. No. 6,392,001.

The formation of allophanate compounds by ring opening of uretdiones with alcohols is known in principle as a crosslinking mechanism in powder coating materials. Nevertheless, the reaction temperatures required for this purpose, in the absence of catalysts, are too high (≥130° C.) for many prepreg applications. Catalysts such as organo-metallic compounds have been found to lower the reaction temperatures (<130° C.; cf. Proceedings of the International Waterborne, High-Solids, and Powder Coatings Symposium 2001, 28th, 405-419).

Historically, the direct reaction of uretdione rings with alcohols to form allophanates was first investigated for solventborne, isocyanate-free, 2K [2-component] polyurethane coating materials. Without catalysis, this reaction is of no technical importance due to the low reaction rate (F. Schmitt, Angew. Makromol. Chem. (1989), 171, pp. 21-38). With appropriate catalysts, however, the crosslinking reaction between hexamethylene diisocyanate (HDI)-based uretdione curatives and olefinic unsaturated alcohols is reported to begin at <130° C. (U.S. Pat. No. 8,202,618). The use of uretdione groups as curing agents in prepreg materials which cure from 100 to 160° C. has also been disclosed in U.S. Pat. Application 2012/0003890. The prepregs according to the invention use matrix materials which have Tg values of ≥40° C. As such, the matrix materials are dry when applied to the fiber, and the prepreg material lacks any tack. In certain industries, a prepreg material with a certain amount of tackiness may aid in aligning layers in a mold.

It was, therefore, an objective of the present invention to develop new solvent-free, storable matrix compositions which may be hardened at low temperature to form composites which combine high impact strength and dimensional stability. An additional objective of the present invention was to develop new prepreg materials with low exotherms and low pre-cure glass transition temperatures, yet high post-cure glass transition temperatures that would be useful in the renewable energy market.

SUMMARY OF THE INVENTION

According to its major aspects, and briefly stated, the present invention includes a dual-cure composition which may be used as the matrix in a prepreg material, a prepreg material comprising the dual-cure composition and a fibrous support, and methods for producing the dual-cure composition, the prepreg material comprising said dual-cure composition, and composites made from the prepreg material.

The present invention relates to a dual-cure composition which cures at 80-130° C. and has a heat of polymerization of less than 170 J/g, preferably less than 130 J/g, comprising:

a multifunctional diol or polyol, which may be a free radically reactive monomer selected from the group consisting of a vinyl ether, an allyl ether, an acrylate, a methacrylate, a urethane acrylate, alone or in a mixture, or may be a non-free radically reactive oligomer selected from the group consisting of an ether, an epoxy, an alkyd, a urethane, alone or in a mixture;

a curing agent containing uretdione groups, which may consist essentially of a curing agent containing at least one aliphatic, cycloaliphatic or aromatic polyisocyanate selected from the group consisting of isophorone diisocyanate (IPDI), hexamethylene diisocyanate (HDI), diisocyanatodicyclohexylmethane ($H_{12}$MDI), diphenylmethane 4,4'-diisocyanate and diphenylmethane 2,4'-diisocyanate (MDI), and 2,4- and 2,6-toluene diisocyanate (TDI);

a low viscosity unsaturated reactive diluent, which may be a peroxide curable monomer selected from the group consisting of a (meth)acrylate, a urethane (meth)acrylate, a polyester (meth)acrylate, a polyether (meth)acrylate, an allyl ether (meth)acrylate, an ester (meth)acrylate, an allophonate urethane (meth)acrylate, an epoxy (meth)acrylate, a vinyl ether, alone or in a mixture;

at least one reactively activatable catalyst, which may be (i) a lewis acid comprising at least one metallo-organic catalyst of the general formula $R_n MeX_y$, in which Me means a metal, R means an alkyl residue, X means a carboxylate residue, an alcoholate residue, or an acetylacetonate residue, n=0 or 2, and y=2 or 3, or (ii) a tetralkylammonium salt and/or phosphonium salt with halogens, with hydroxides, with alcoholates or with organic or inorganic acid anions as counter-ion;

a thermal crosslinking initiator, which may consist essentially of a peroxide or hydro-peroxide compound, or an initiator which can be activated by actinic radiation;

optionally (G) an acid scavenger such as an epoxide; and optionally (H) an acrylate co-catalyst.

The present invention also relates to a process for the production of a dual-cure composite comprising:

homogenizing a pre-polymer composition comprising components (A), (B), (C), optionally (G), and optionally (H) as listed above;

heating the pre-polymer composition to a temperature above the Tg of component (B);

cooling the heated pre-polymer composition to a temperature of less than 110° C.;

mixing the cooled pre-polymer composition with a dual-cure catalyst composition to form a dual-cure composition, the catalyst composition comprising components (D) and (E) as listed above; and curing the dual-cure composition at a temperature of from 80° C. to 130° C. for a period of time sufficient to form a cured composite.

The process for the production of a dual-cure composite may further comprise the additional step of: (vi) adding to said prepolymer composition during and/or after step (i) but before step (v) component (F), which is a fibrous support material.

In another embodiment, the final density of the cured composite formed by the aforementioned process may be less than 1.20 g/ml, preferably less than 1.15 g/ml. Further, the dual-cure composition may have a $T_g$ of from −20° C. to +20° C. and the cured composite may have a $T_g$ of from 70° C. to 130° C.

The present invention also relates to a prepreg material comprising (i) at least one fibrous material support, and (ii) a dual-cure composition comprising components (A), (B), (C), (D), (E), optionally (G), and optionally (H) as listed above. The fibrous material support may be carbon, aramid, glass, ceramic, quartz, boron, polyester, polyethylene, polyoxazoline or natural fibers. In another embodiment, the heat of polymerization of the final prepreg material may be less than 170 J/g, preferably less than 130 J/g. In further embodiments, the prepreg material may be converted to a composite component by exposure to a temperature of from 80° C. to 130° C. for a period of time sufficient to form a cured composite.

BRIEF DESCRIPTION OF THE DRAWINGS

Aspects, features, benefits and advantages of the embodiments herein will be apparent with regard to the following description, appended claims, and accompanying drawings.

FIG. 2A shows glass fibers that are uniformly dispersed in the composite sample formed using the dual-cure composition of the present invention. FIGS. 2B and 2C show composites formed using the epoxy compositions of the prior art.

FIG. 3A shows the glass fibers more tightly packed in comparison to the prior art as shown in FIG. 3B.

DETAILED DESCRIPTION OF THE PREFERRED EMBODIMENTS

Figure 1:
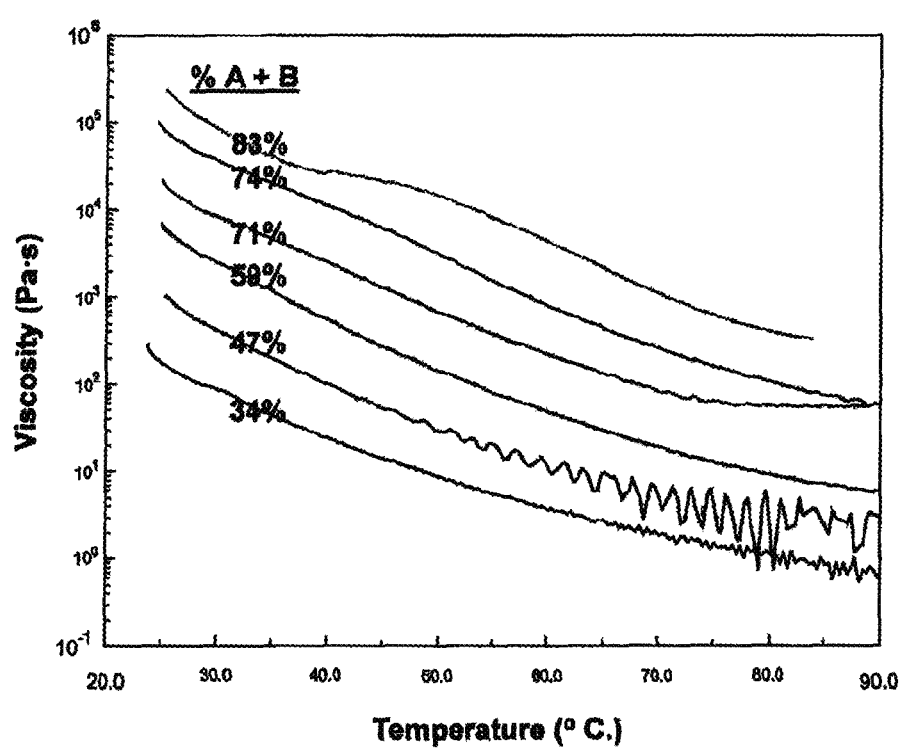
FIG. 1 illustrates experimental viscosity profiles for various dual-cure compositions in accordance with certain aspects of the present invention.

For purposes of the following detailed description, it is to be understood that the present invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances:

In the following description, the present invention is set forth in the context of various alternative embodiments and implementations involving a dual-cure composition which may be used as the matrix in a prepreg material, a prepreg material comprising the dual-cure composition and a fibrous support, and methods for producing the dual-cure composition, the prepreg material comprising said dual-cure composition, and composite components made from the prepreg material. The term "prepreg" as used herein preferably refers to a composite, whether in rod, rope, fiber, roving, strand, tow, sheet, or other form, which comprises a reinforcing fiber or other such substrate (support) impregnated with a resin or polymer composition (matrix).

The dual-cure composition of the present invention cures at temperatures between 80-130° C. and consist essentially of:

a multifunctional polyol,
a curing agent containing uretdione groups,
a low viscosity unsaturated reactive diluent,
at least one reactively activatable catalyst,
a thermal crosslinking initiator, optionally,
an epoxy acid scavenger; and optionally
an acrylate co-catalyst As compared to the standard matrix materials used in prepregs of the prior art, the dual-cure composition of the present invention exhibits several advantages. One major advantage is a lower cure temperature. The dual-cure composition of the present invention may be cured at temperatures between 80 and 130° C., yet may exhibit a long room temperature shelf-life of several months and a cold stored shelf-life of greater than six months.

Another major advantage is a much lower exotherm. The dual-cure composition of the present invention may release ≤130 J/g as compared to typical epoxy resins that release an exotherm on the order of 300 J/g. The lower exotherm may result in increased productivity for the composite manufacturer due to the ability to rapidly increase the curing temperature without releasing the exotherm all at once and thereby overheating the support, the matrix, or the molds and even scorching the final composite. For example, the dual-cure composition of the present invention may be safely cured at a temperature of 130° C. with an increased ramp rate 5° C./minute). In addition, the lower exotherm of the dual-cure composition may allow for thicker/larger composite parts fabrication, as multiple layers of prepreg may be used to build strength.

Figure 2A:
FIGS. 2A, 2B and 2C are a series of scanning electron microscope (SEM) images at 50× magnification depicting cross sections of composites formed using (a) a dual-cure composition in accordance with certain aspects of the present invention, and (b, c) epoxy compositions of the prior art.
Figure 2B:
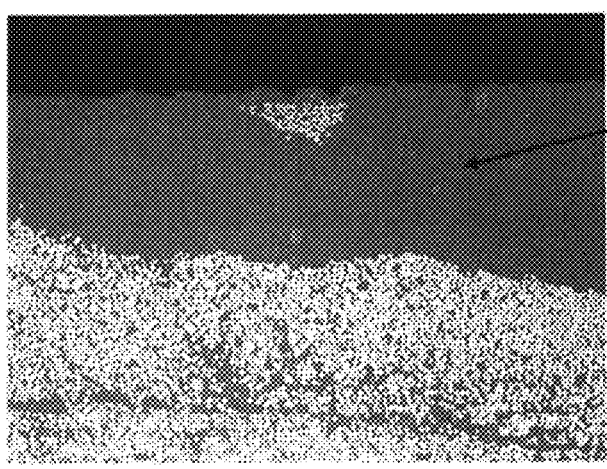
Figure 2C:
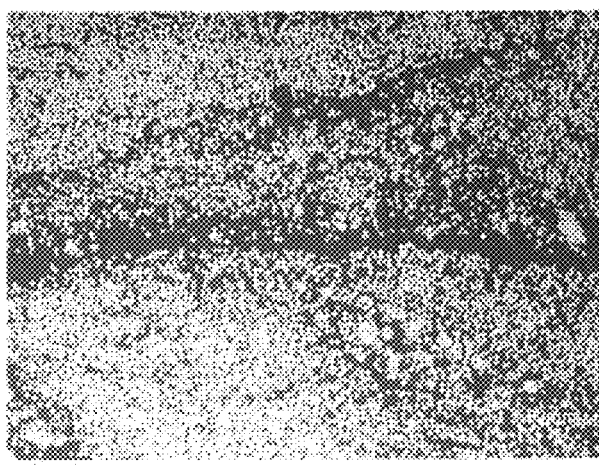
Figure 3A:
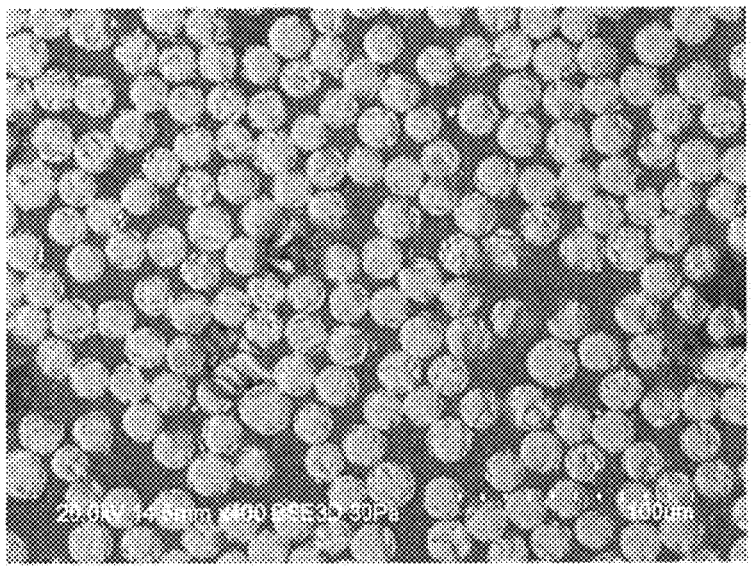
FIGS. 3A and 3B are a series of scanning electron microscope (SEM) images at 400× magnification depicting cross sections of composites formed using (a) a dual-cure composition in accordance with certain aspects of the present invention and (b, c) epoxy compositions of the prior art.
Figure 3B:
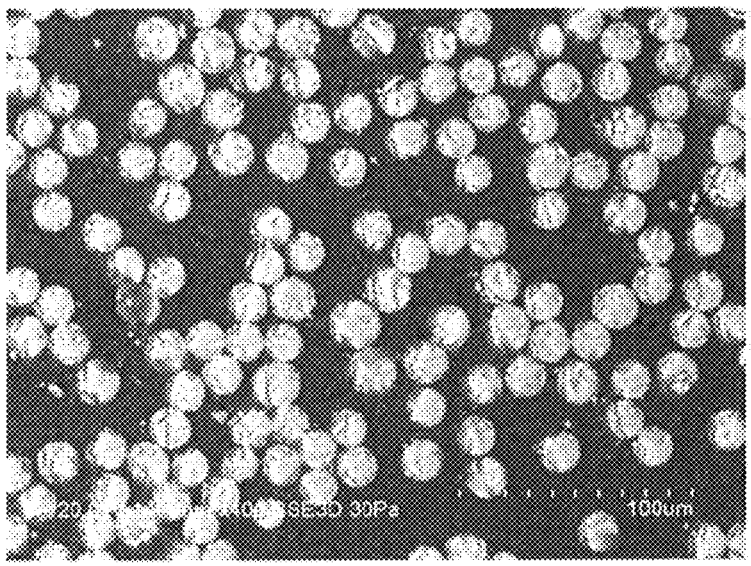

Moreover, the dual-cure composition of the present invention has considerably better fiber wet out properties than the prior art matrix materials. The improved fiber wet out, which may lead to improved mechanical strength in the final composite components, can be assessed visually by scanning electron microscopy (SEM). FIGS. 2 and 3 show a series of SEM micrographs at 50× and 400× magnification for cross sections of composites formed using a dual-cure composition of the present invention and epoxy compositions of the prior art. FIG. 2A shows that the glass fibers are uniformly dispersed in the composite sample formed using the dual-cure composition of the present invention. FIGS. 2B and 2C, on the other hand, show that composites formed using the epoxy compositions of the prior art have regions of non-glass fiber containing material (voids which are filled with resin only). Furthermore, FIG. 2C shows regions where the glass fibers are clustered together. Composites formed using a dual-cure composition of the present invention also show a greater fiber content (e.g. the glass fibers are more tightly packed, see FIG. 3A) as compared with a composite formed using the epoxy compositions of the prior art (FIG. 3B).

It is well known in the art that decreased mechanical strength in a fiber reinforced composite component can often be traced to poor or incomplete impregnation of the reinforcing fiber with the resin matrix material. Viscosity of the resin matrix material is the single most important factor in good fiber wet-out: lower viscosity leads to better fiber wet-out. Surprisingly, the components of the dual-cure composition of the present invention are not lower viscosity than the prior art epoxy resins and yet show excellent fiber wet-out properties which are measurably better than the prior art epoxy resins (see FIGS. 2 and 3).

The dual-cure compositions of the present invention are formulated to improve fiber wet-out and thus provide prepregs that may be used in the manufacture of composite components with exceptional mechanical strength and dimensional stability. The enhanced fiber wet out may also lower the matrix material demand in the composite component, resulting in higher fiber volume while still maintaining acceptable levels of adhesion between the dual-cure composition and the fibers.

Once cured, the dual-cure composition of the present invention has a much lower density than prior art matrix materials. For example, the dual-cure composition of the present invention may have a density of less than 1.20 g/ml, preferably less than 1.15 g/mL once cured resulting in significant weight and cost savings as compared to the prior art epoxy resins with densities of 1.20 g/ml or greater. Furthermore, a lower density may result in decreased exotherms by reducing the resin weight at a given fiber volume.

The dual-cure composition of the present invention has been found to exhibit at least two thermal transitions, as measured by dynamic mechanical analysis, corresponding to the relaxation in the uretdione and free radically-cured resin glass transition temperatures ($T_g$). In addition to the two transitions, a broadened shoulder developed on the $T_g$ relaxation of the resin. This is likely due to an increased interphase between the resin and uretdione matrix and is indicative of a rather complex morphology. It has been proposed from studies in other resins (cf. Gryshchuk et al., Journal of Applied Polymer Science (2002) 84, pp. 672-80) that such transitions and the broadened shoulders between these transitions are indicative of increased toughness in the resin. Such increased toughness may convey an increased fatigue resistance for composites made using the dual-cure composition of the present invention.

Prior art epoxy prepregs are not stable at room temperature and will increase molecular weight at ambient conditions resulting in a loss of tack and drape. Thus far, we have found that prepregs formulated using the dual-cure composition of the present invention are stable at room temperature resulting in reduced transportation, storage, and preparation (rolls of the prior art epoxy prepreg must be allowed to thaw overnight) costs. Currently, epoxy gel coats are used in the mold and the composite parts are overcoated after demolding by pigmented coatings (e.g. paints) to provide more uniform color. The dual-cure composition of the present invention may allow for increased compatibility with gel-coats that could eliminate the 2-step coating process previously described. Furthermore, the composite's outer layer could be comprised of a resin rich pigmented matrix, allowing the gel coat to be eliminated altogether.

Thus, a first embodiment of the present invention is a dual-cure composition consisting essentially of: (A) a multifunctional polyol, (B) a curing agent containing uretdione groups, (C) a low viscosity unsaturated reactive diluent, (D) at least one reactively activatable catalyst, (E) a thermal crosslinking initiator, optionally (G) an epoxy acid scavenger, and optionally (H) an acrylate co-catalyst.

Suitable as component (A) in the dual-cure composition of the present invention are multifunctional polyols that are either free radically reactive monomers or non-free radically reactive oligomers. The term "polyol" is meant to include materials having an average of two or more hydroxyl groups per molecule. As used herein, (meth)acrylate may be taken to include acrylates and methacrylates.

The free radically reactive polyols may include low molecular weight monomers of monols, diols, triols and higher alcohols and polyols such as vinyl ether polyols, (meth)acrylate polyols, urethane (meth)acrylate polyols, ethoxy (meth)acrylate polyols, polyester (meth)acrylate, epoxy (meth)acrylate polyols, and polyether (meth)acrylate polyols. The term "monomer" may be taken to mean the simple unpolymerized form of a chemical compound having relatively low molecular weight, e.g., a molecular weight below 5000 KDa. Preferably, low molecular weight may be taken to mean a molecular weight below 1000 KDa. Component (A) may be a free radically reactive monomer selected from the group consisting of a vinyl ether, an allyl ether, an acrylate, a methacrylate, a urethane acrylate, allophanate acrylate, epoxy acrylate, alone or in a mixture. Alternatively, component (A) may be a non-free radically reactive oligomer selected from the group consisting of an ether, an ester, an epoxy, an alkyd, a urethane, alone or in a mixture.

Examples of suitable free radically reactive polyols of component (A) are those containing vinyl ether, urethane, urethane acrylate, epoxy acrylate, maleyl, fumaryl, maleimide, dicyclopentadienyl, acrylamide, and (meth)acrylic groups, preference being given to vinyl ethers and/or (meth) acrylates, more preferably acrylates. Examples of suitable hydroxyl-containing compounds of component (A) are 2-hydroxypropyl (meth)acrylate, 4-hydroxybutyl (meth) acrylate, hydroxybutyl vinyl ether, 3-hydroxy-2,2-dimethyl-propyl (meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta (meth)acrylate, which are obtainable by reacting polyhydric, optionally alkoxylated alcohols such as trimethylolpropane, glycerol, pentaerythritol, dipentaerythritol.

Likewise, suitable as component (A) as well are alcohols obtained from the reaction of acids containing double bonds with epoxide compounds optionally containing double bonds, such as, for example, the reaction products of (meth) acrylic acid with glycidyl (meth)acrylate or bisphenol A diglycidyl ether. Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl (meth) acrylate and glycidyl (meth)acrylate. Preferred commercially available examples of such include the difunctional bisphenol A based epoxy acrylate Sartomer CN120 offered by Sartomer Company (Exton, Pa.), the epoxy acrylates Ebecryl® offered by Cytec Industries Inc., and the unsaturated aromatic epoxy acrylate Desmolux™ VP LS 2266 offered by Bayer MaterialScience, LLC (Pittsburgh, Pa.).

Suitable polyester (meth)acrylates include polycondensation products of dicarboxylic or oligocarboxylic acids or the anhydrides thereof (for example, adipic acid, sebacic acid, maleic anhydride, fumaric acid and phthalic acid) and difunctional polyols and/or polyols of higher functionality (e.g. ethylene glycol, propylene glycol, diethylene glycol, trimethylolpropane, pentaerythritol, alkoxylated diols or polyols, such as the addition product of ethylene oxide on trimethylolpropane with a hydroxyl value of 550) and (meth)acrylic acid. Alternatively, the polyester (meth)acrylates may include polycondensation products of dicarboxylic or oligocarboxylic acids or the anhydrides thereof and hydroxyl acrylates or epoxy acrylates (e.g. hydroxy ethyl acrylate or glycidyl methacrylate). The production of polyester acrylates is described in DE-A-4 040 290, DE-A-3 316 592, P. K. T. Oldring (Ed.), Chemistry & Technology of UV & EB Formulations for Coatings, Inks & Paints, Vol. 2, 1991, SITA Technology, London, pp 123-135.

Alternatively, known poly-epoxy acrylates containing hydroxyl groups or polyurethane acrylates containing hydroxyl groups may also be employed, as well as mixtures thereof with one another and with unsaturated and/or saturated polyesters containing hydroxyl groups. One commercially available hydroxy ethyl acrylate is Tone® M-100 offered by Dow Chemicals.

In certain embodiments of the dual-cure composition of the present invention, component (A) may be a multifunctional polyol which is a non-free radically reactive oligomer with functionality greater than 2, preferable greater than 3. Examples of suitable non-free radically reactive oligomers of component (A) includes polyester polyols, polyether polyols, or low molecular weight polyols such as, for example, ethylene glycol, 1,2- and 1,3-propanediol, isomeric butanediols, neopentyl glycol, 1,6-hexanediol, 2-methyl-1,3-propanediol, 2,2,4-trimethyl-1,3-pentanediol, 2-n-butyl-2-ethyl-1,3-propanediol, glycerol monoalkanoates (such as for example glycerol monostearates), dimer fatty alcohols, diethylene glycol, triethylene glycol, tetraethylene glycol, 1,4-dimethylolcyclohexane, dodecanediol, alkoxylated bisphenol A, hydrogenated bisphenol A, 1,3-hexanediol, 1,3-octanediol, 1,3-decandiol, 3-methyl-1,5-pentanediol, 3,3-dimethyl-1,2-butanediol, 2-methyl-1,3-pentanediol, 2-methyl-2,4-pentanediol, 3-hydroxymethyl-4-heptanol, 2-hydroxymethyl-2,3-dimethyl-1-pentanol, glycerol, trimethylolethane, trimethylolpropane, trimer fatty alcohols, isomeric hexanetriols, sorbitol, pentaerythritol, ditrimethylolpropane, dipentaerythritol, diglycerol and 4,8-bis (hydroxymethyl)-tricyclo[$5.2.0^{2.6}$]-decane (TCD alcohol).

Suitable polyester polyols include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. A preferred commercially available example of one such component (A) is the polyester polyol Desmophen® 2035 offered by Bayer MaterialScience LLC (Pittsburgh, Pa.).

Suitable polyether polyols may be prepared by the reaction of suitable starting compounds which contain reactive hydrogen atoms with alkylene oxides such as, for example, ethylene oxide, propylene oxide, butylene oxide, styrene oxide, tetrahydrofuran, epichlorohydrin, and mixtures thereof. Suitable starting compounds containing reactive hydrogen atoms include compounds such as, for example, ethylene glycol, propylene glycol, butylene glycol, hexanediol, octanediol, neopentyl glycol, cyclohexanedimethanol, 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, glycerine, trimethylolpropane, pentaerythritol, water, methanol, ethanol, 1,2,6-hexane triol, 1,2,4-butane triol, trimethylolethane, mannitol, sorbitol, methyl glycoside, sucrose, phenol, resorcinol, hydroquinone, 1,1,1- or 1,1,2-tris-(hydroxyphenyl)-ethane, etc.

Preferable polyether polyols include, for example, polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. Particularly preferred low viscosity multifunctional non-free radically reactive polyols are the propylene oxide based polyols with hydroxyl numbers greater than 225, preferably with hydroxyl numbers greater than 500. Preferred commercially available examples of such component (A) are the polyether polyol MULTRANOL® 9170 and Arcol® LG-650 offered by Bayer MaterialScience LLC (Pittsburgh, Pa.), and Pluracol® TP 340 offered by BASF Corporation (North America).

Suitable as component (B) in the dual-cure composition of the present invention are aromatic or (cyclo)aliphatic diisocyanates or polyisocyanates containing uretdione groups. As used herein, aliphatic and cycloaliphatic are designated as (cyclo)aliphatic. The diisocyanates or polyisocyantes containing uretdione rings (dimeric diisocyanates or dimeric polyisocyanates) used in the present invention are preferably solids with melting points above 40° C. but preferably below 100° C., more preferably below 80° C. Mixtures of such diisocyanates or polyisocyanates may also be used.

Examples of suitable diisocyanates or polyisocyanates include butylene diisocyanate, hexamethylene diisocyanate (HDI), isophorone diisocyanate (IPDI), 2,2,4- and/or 2,4,4-trimethylhexamethylene diisocyanate, the isomeric bis(4,4-isocyanatocyclohexyl)methanes ($H_{12}MDI$), isocyanatomethyl-1,8-octane diisocyanate, 1,4-cyclohexylene diisocyanate, the isomeric cyclohexanedimethylene diisocyanates, 1,4-phenylene diisocyanate (PDI), 2,4- and/or 2,6-tolylene diisocyanate (TDI), m-xylene diisocyanate (XDI), 1,5-naphthylene diisocyanate, 2,4'- or 4,4'-diphenylmethane diisocyanate (MDI), triphenylmethane 4,4',4''-triisocyanate or polyisocyanate adducts prepared from these diisocyanates and polyisocyanates and may contain additional urethane, urea, carbodiimide, acylurea, isocyanurate, allophanate, biuret, oxadiazinetrione, uretdione, iminooxadiazine dione groups, and mixtures thereof.

Preferred diisocyanates or polyisocyanates containing uretdione groups are IPDI, HDI, MDI, TDI and $H_{12}MDI$. Particularly preferred diisocyanates or polyisocyanates containing uretdione groups are IPDI and HDI. Preferred commercially available examples of such component (B) are the cycloaliphatic polyuretdione CRELAN® EF 403 offered by Bayer MaterialScience LLC (Pittsburgh, Pa.), and Vestagon® 1321 and 1540 offered by Evonik Degussa Corporation (Parsippany, N.J.).

The preparation of uretdione diisocyanates and polyisocyanates from the corresponding diisocyanates and polyisocyanates is well known in the art. An overview of isocyanate oligomerization is given in J. Prakt. Chem./Chem. Ztg. 1994, 336, 185-200. For example, uretdione diisocyanates have been prepared by dimerization of the above-mentioned diisocyanates and polyisocyanates with catalysts such as trialkylphosphites (DE-OS 2,349,726), peralkylated carbamoylphosphines (U.S. Pat. No. 3,290,288), peralkylated aminophosphines (U.S. Pat. No. 3,290,288), tertiary phosphines (U.S. Pat. No. 8,058,382), pyridines (U.S. Pat. No. 8,134,014), dialkylarylphosphines and alkyldiarylphosphines (U.S. Pat. No. 2,671,082), to name a few.

Suitable as component (C) in the dual-cure composition of the present invention are low viscosity unsaturated reactive diluents, such as (meth)acrylates, urethanes, siloxanes, esters, carbonates, epoxies and ethers containing groups which react, with polymerization, with ethylenically unsaturated compounds through exposure to free radical polymerization. Such groups include α,β-unsaturated carboxylic acid derivatives such as (meth)acrylates, maleates, fumarates, maleimides, acrylamides, vinyl ethers, propenyl ethers, allyl ethers, and compounds containing dicyclopentadienyl units. Preferred are acrylates and methacrylates. Examples include the reactive diluents known in radiation curing technology (cf. Römpp Lexikon Chemie, p. 491, 10th ed. 1998, Georg-Thieme-Verlag, Stuttgart) or the known binders from radiation curing technology, such as polyether acrylates, polyester acrylates, urethane acrylates, epoxy acrylates, melamine acrylates, silicone acrylates, polycarbonate acrylates and acrylated polyacrylates. Preferred commercially available examples of component (C) are the unsaturated aliphatic allophanate urethane acrylate Desmolux® XP 2738 offered by Bayer MaterialScience LLC (Pittsburgh, Pa.) or the ethoxylated bisphenol A dimethacrylate Sartomer SR540 offered by Sartomer Company (Exton, Pa.). Both have low viscosities (shear viscosity at 23° C. of ≤30,000 m Pa s).

Suitable as component (D) in the dual-cure composition of the present invention are catalysts that may be metallo-organic compounds of the general formula:

$$R_2MeX_2$$

in which Me means a metal, R means an alkyl residue, and X means a carboxylate or alcoholate residue, as well as metallo-organic compounds of the general formula:

$$Z_nMe$$

in which Me means a metal, Z means an acteylacetonate residue, and n=2 or 3. Further, any unspecified mixtures of such metallo-organic catalysts may be suitable as component (D).

Metal containing catalysts suitable as component (D) further include any organic or inorganic metal salt such as, for example, salts of zinc(II), calcium, magnesium, aluminum(III), zirconium(IV), iron(III), tin(II), organitin(IV) such as dibutyltin(IV), and molybdenum. Examples of such metal salts include, at least, iron(III) chloride, tin(II) octoate, tin(II) ethylcaproate, tin(II) palmitate, dibutyltin(IV) dilaurate, dibutyltin(IV) diacetate and molybdenum glycolate, zinc(II) acetylacetonate, calcium acetylacetonate, magnesium acetylacetonate, aluminum(III) acetylacetonate, zirconium(IV) acetylacetonate, and or mixtures thereof.

Preferable catalysts useful as component (D) are zinc compounds, such as zinc oxide, zinc sulphide, zinc carbonate, zinc fluoride, zinc chloride, zinc bromide, zinc iodide, zinc phosphate, zinc borate, zinc titanate, zinc hexafluorosilicate, zinc sulphite, zinc sulphate, zinc nitrate, zinc tetrafluoroborate, zinc acetate, zinc octoate, zinc cyclohexanebutyrate, zinc laurate, zinc palmitate, zinc stearate, zinc beherate, zinc citrate, zinc gluconate, zinc acetylacetonate, zinc 2,2,6,6-tetramethyl-3,5-heptanedionate, zinc trifluoracetate, zinc trifluoromethane-sulphonate, zinc dimethyldithiocarbamate and mixtures of these compounds. More preferred as component (D) is zinc acetylacetonate.

Additional catalysts useful as component (D) may further include tetralkylammonium salts and/or phosphonium salts with halogens, with hydroxides, with alcoholates or with organic or inorganic acid anions as counter-ion. Such catalysts can be added alone or in a mixture. Preferred examples of component (D) are tetrabutylammonium acetate and benzyltrimethylammonium chloride (BMAC).

Additional catalysts useful as component (D) may further include catalysts with an amidine structure such as, for example, 1,8-Diazabicyclo[5.4.0]undec-7-ene (DBU).

The compounds of catalyst component (D) can be dissolved advantageously in one of the components used in the process, or in a portion thereof. In particular, the zinc compounds for use in accordance with the present invention dissolve very well in the polyols of component (A), so that component (D) in solution in small amounts of component (A) can be metered in as a concentrated solution in liquid form.

In the process of the present invention, catalyst component (D) is preferably used in amounts of 0.001 to 10.0% by weight, more preferably 0.01 to 5.0% by weight and most preferably 0.05 to 2.0% by weight, based on the solids content of the product.

Suitable as component (E) in the dual-cure composition of the present invention are thermal crosslinking initiators, such as those capable of thermal curing of activated double bonds using thermally decomposing free-radicals initiators.

The free radical polymerization reaction may be initiated by peroxides or hydroperoxides by the addition of heat. Peroxides which can be used for the purposes of the present invention are preferably organic peroxides with the general formula R—O—O—R which decompose into radicals at from 0° to 250° C., preferably from 40° to 180° C., and which can be used for initiating radical polymerization reactions. Examples include: sulphonyl peroxides, such as acetyl cyclohexane sulphonyl peroxide; percarbonates, such as dicyclohexyl peroxy dicarbonate; di-n-butyl peroxy dicarbonate and diisopropyl peroxy dicarbonate; peresters, such as tert.-butyl peroxy pivalate, tert.-butyl perneodecanoate and tert.-butyl perbenzoate; diacyl peroxides, such as bis-(3,3,5-trimethyl-hexanoyl)-peroxide; dilauroyl peroxide; didecanoyl peroxide, dipropionyl peroxide; bis-(2,4-dichlorobenzoyl)-peroxide and dibenzoyl peroxide; dialkyl peroxides, such as dicumyl peroxide and di-tert.-butyl peroxide; ketal peroxides, such as 1,1-di-tert.-butyl peroxy-3,3,5-trimethyl cyclohexane; alkyl hydroperoxides, such as cumene hydroperoxide and tert.-butyl hydroperoxide, and ketone peroxides, such as cyclohexanone peroxide and ethyl methyl ketone peroxide.

Further, the free radical polymerization reaction may be initiated by percarboxylic acid esters and azo compounds by the addition of heat. The percarboxylic acid esters include compounds such as tertiary butyl peroctoate and tertiary butyl perpivalate. The azo compounds include compounds such as 2,2'-azo-bis-isobutyronitrile (AIBN), 2,2'-azo-bis-2-methyl-butyronitrile, 1,1'-azo-dicyclopentane-carbonitrile, 1,1'-azo-dicyclohexane-carbonitrile, 2,2'-azo-bis-cyclopentylpropionitrile, 1,1'-azo-dicampher-carbonitrile, 2,2'-azo-bis($\alpha$,$\gamma$-dimethyl-valeronitrile), 2,2'-azo-bis-2-phenylpropionitrile, 2,2'-azo-bis-2-benzyl-propionitrile and 2,2'-azo-bis-2-(4-methoxyphenyl)-propionitrile.

It is desirable that the thermal crosslinking initiators decomposition rate may be fairly high, i.e., that the half-life period of thermal decomposition be short enough under the polymerization conditions to ensure that an adequate supply of radicals is available in the reaction mixture. Preferred initiators thus include, for example, organic peroxides, such as benzoyl peroxide or lauroyl peroxide, and diacyl peroxides such as ducumyl peroxide.

Also suitable as component (E) in the dual-cure composition of the present invention are initiators which can be activated by actinic radiation and which trigger free-radical polymerization of the corresponding polymerizable groups. Photoinitiators activated by UV or visible light are preferred. Photoinitiators are known and include both unimolecular (type I) and bimolecular (type II) initiators. Suitable (type I) systems include aromatic ketone compounds, e.g. benzophenones in combination with tertiary amines, alkylbenzophenones, 4,4'-bis(dimethylamino)benzophenone (Michler's ketone), anthrone, halogenated benzophenones or mixtures thereof. Also suitable are (type II) initiators such as benzoin and its derivatives, benzil ketals, acylphosphine oxides such as 2,4,6-trimethylbenzoyldiphenylphosphine oxide, bisacyiphosphine oxides, phenyiglyoxylic esters, camphorquinone, $\alpha$-aminoalkylphenones, $\alpha$,$\alpha$-dialkoxyacetophenones and $\alpha$-hydroxyalkylphenones. Where the coating composition of the invention is to be processed on an aqueous basis, it is preferred to use photoinitiators which can be readily incorporated into aqueous coating compositions. Examples of such products include Irgacure® 500, Irgacure® 819 DW (Ciba, Lampertheim, Del.) and Esacure® KIP (Lamberti, Aldizzate, Italy). Mixtures of these compounds can also be used.

In the process of the present invention, thermal crosslinking initiator component (E) is preferably used in amounts of 0.001 to 10.0% by weight, more preferably 0.01 to 5.0% by weight and most preferably 0.05 to 2.0% by weight, based on the solids content of the product.

In certain embodiments of the dual-cure composition of the present invention, the components may be mixed in ratios that provide from 15 to 45% by weight of component (A), from 25 to 75% by weight of component (B), and from 15 to 55% by weight of component (C), based on the solids content of the product.

The relative amounts of component (A) and component (B) can vary somewhat depending on their respective molecular weights. Typically, they can each be present in amounts within the range of 10 to 90% by weight based on resin solids weight of the components. The equivalent ratio of hydroxyl to uretidione is typically from 0.5:1.0 to 2.0:1, preferably from 0.8:1 to 1.1:1 and most preferable from 0.8:1 to 0.9:1.

Furthermore, the dual-cure composition of the present invention may optionally comprise additional epoxy functional molecules and acrylate co-catalysts. As such, embodiments of the dual-cure composition may further comprise component (G) which is an epoxy functional molecule and component (H) which is an acrylate co-catalyst.

Suitable as component (G) in the dual-cure composition of the present invention are epoxy functional molecules which may act as acid scavengers. Any chemical compound which contains the epoxide (oxirane) functionality is most suitable as the acid scavenger in the present invention. The term "epoxide" or "epoxy", as used herein, refers to any organic compound or resin containing at least one group comprising a three membered oxirane ring. Preferably two or more oxirane groups are present in the epoxide compound or resin in order to obtain the polyisocyanate compositions with consistent reactivity profiles of the present invention. The epoxide equivalent weight (EEW) range of suitable epoxides is from about 44 to 400, preferably 100 to 350 and most preferably 150 to 300. Both aromatic and aliphatic polyepoxides may be used, and are well known. Suitable epoxides are described in U.S. Pat. No. 5,726,240.

Thus, suitable as component (G) are glycidyl ethers, glycidyl esters, aliphatic epoxides, diglycidyl ethers based on bisphenol A, glycidyl (meth)acrylates, alone or in a mixture. Further examples are monoepoxide compounds or polyfunctional epoxides, in particular di- or trifunctional epoxides. Examples include epoxidized olefins, glycidyl ethers of (cyclo)aliphatic or aromatic polyols and/or glycidyl esters of saturated or unsaturated carboxylic acids. Preferred monoepoxide compounds include glycidyl (meth)acrylate, the glycidyl ester of versatic acid, butyl-glycidyl ether, 2-ethylhexyl-glycidyl ether, phenyl-glycidyl ether, o-cresyl-glycidyl ether or 1,2-epoxybutane. Glycidyl methacrylate is preferred. Preferred polyepoxide compounds include polyglycidyl compounds of the bisphenol A or bisphenol F type as well as the perhydrogenated derivatives thereof or glycidyl ethers of polyfunctional alcohols such as butanediol, hexanediol, cyclohexanedimethanol, glycerol, trimethylolpropane or pentaerythritol. It is also possible to use epoxy-functional polymers of vinyl monomers such as monofunctional (meth)acrylates or styrene along with the use of a proportion of e.g. glycidyl methacrylate.

Suitable as component (H) in the dual-cure composition of the present invention are acrylate co-catalysts such as free radical reactivity controllers or radical scavengers which may allow for improved stability of the matrix materials prior to curing. Such compounds may inhibit free radical reactivity below a specific temperature, and thus may stabilize the matrix materials and prepreg when at room temperature. The radical scavenger may comprise a nitroxide radical. Suitable nitroxide radicals include, but are not limited to, SG-1 (nitroxide, 1-(diethoxyphosphinyl)-2,2-dimethylpropyl 1,1-dimethylethyl free radical); TEMPO (2,2,6,6-tetramethyl-1-piperidinyloxy free radical); PROXYL (2,2,5,5-tetramethyl-1-pyrrolidinyloxy free radical); and mixtures thereof.

TEMPO free radicals and their deriviatives may include, for example, 4-hydroxy TEMPO free radical (4-hydroxy-2,2,6,6-tetramethyl-1-piperidinyloxy free radical); TEMPO-Polymer Bound or PS-TEMPO (2,2,6,6-tetramethyl-1-piperidinyloxy free radical)-polymer bound; 4-(2-bromoacetamido)-TEMPO free radical (4-(2-bromoacetamido)-2,2,6,6-tetramethyl-1-piperidinyloxy free radical); 4-(2-iodoacetamido)-TEMPO free radical (4-(2-iodoacetamido)-2,2,6,6-tetramethyl-1-piperidinyloxy free radical); 4-acetamido-TEMPO free radical (4-acetamido-2,2,6,6-tetramethylpiperidine 1-oxyl free radical); 4-amino-TEMPO free radical (4-amino-2,2,6,6-tetramethylpiperidine-1-oxyl free radical); 4-carboxy-TEMPO free radical (4-carboxy-2,2,6,6-tetramethylpiperidinyloxy, free radical); 4-hydroxy-TEMPO benzoate free radical (4-hydroxy-2,2,6,6-tetramethylpiperidine 1-oxyl benzoate free radical); 4-maleimido-TEMPO free radical (4-maleimido-2,2,6,6-tetramethyl-1-piperidinyloxy free radical); 4-methoxy-TEMPO free radical (4-methoxy-2,2,6,6-tetramethyl-1-piperidinyloxy free radical); 4-oxo-TEMPO free radical (4-oxo-2,2,6,6-tetramethyl-1-piperidinyloxy free radical); 4-phosphonooxy-TEMPO hydrate free radical (4-phosphonooxy-2,2,6,6-tetramethyl-1-piperidinyloxy, free radical hydrate); and mixtures thereof.

PROXYL free radicals and their derivatives may include, for example, 3-(2-iodoacetamido)-PROXYL free radical (3-(2-iodoacetamido)-2,2,5,5-tetramethyl-1-pyrrolidinyloxy free radical); 3-[2-(2-maleimidoethoxy)ethylcarbamoyl]-PROXYL free radical (3-[2-(2-maleimidoethoxy)ethylcarbamoyl]-2,2,5,5-tetramethyl-1-pyrrolidinyloxy free radical); 3-carbamoyl-PROXYL free radical (3-carbamoyl-2,2,5,5-tetramethylpyrrolidin-1-yloxy free radical); 3-cyano-PROXYL free radical (3-cyano-2,2,5,5-tetramethyl-1-pyrrolidinyloxy free radical); 3-maleimido-PROXYL free radical (3-maleimido-2,2,5,5-tetramethyl-1-pyrrolidinyloxy free radical); 3-(2-bromo-acetoamido-methyl)-PROXYL free radical (3-(2-bromo-p-acetoamido-methyl)-2,2,5,5-tetramethyl-1-pyrrolidinyloxy free radical); 34242-iodoacetamido)acetamido)-PROXYL free radical (3-(2-(2-iodoacetamido)acetamido)-2,2,5,5-tetramethylpyrrolidin-1-yloxy free radical); 3-(2-isothiocyanato-ethyl-carbamoyl)-PROXYL free radical (3-(2-isothiocyanato-ethyl-carbamoyl)-2,2,5,5-tetramethylpyrrolidin-1-yloxy free radical); 3-(3-(2-iodo-acetamido)-propyl-carbamoyl)-PROXYL free radical (3-(3-(2-iodo-acetamido)-propyl-carbamoyl)-2,2,5,5-tetramethylpyrrolidin-1-yloxy free radical); and mixtures thereof.

Other suitable nitroxide free radicals include, for example, 16-doxyl-stearic acid methyl ester free radical; 2,2,3,4,5,5-hexamethyl-3-imidazolinium-1-yloxy methyl sulfate free radical; 2,2,6,6-tetramethyl-4-(methylsulfonyloxy)-1-piperidinooxy free radical; 4-(1-hydroxy-1-methylethyl)2,2,5,5-tetramethyl-3-imidazolinium-1-yloxy free radical; 4-phenacylidene-2,2,5,5-tetramethylimidazolidaz-lidin-1-yloxy free radical; 4-phenyl-2,2,5,5-tetramethyl-3-imidazolin-1-yloxy free radical; 5-DOXYL-stearic acid free radical (2-(3-carboxypropyl)-4,4-dimethyl-2-tridecyl-3-oxazolidinyloxy free radical); methyl 5-DOXYL stearate free radical (2-(4-methoxy-4-oxobutyl)-4,4-dimethyl-2-tridecyl-3-oxazolidinyloxy free radical); 1-hydroxy-2,2,4,6,6-pentamethyl-4-piperidinyl 3,5-di-tert-butyl-4-hydroxybenzoate free radical; 1-hydroxy-2,2,5,5-tetramethyl-2,5-dihydro-1H-pyrrole-3-carboxylic acid free radical; 4-[(1-hydroxy-2,2,6,6-tetramethyl-4-piperidinyl)amino]-4-oxo-2-butenoic acid free radical; bis(1-hydroxy-2,2,4,6,6-pentamethyl-4-piperidinyl)oxalate free radical; tris(1-hydroxy-2,2,4,6,6-pentamethyl-4-piperidinyl)phosphinetricarboxylate free radical; CYPMPO (2-(5,5-dimethyl-2-oxo-2-lambda-5-[1,3,2]dioxaphosphinan-2-yl)-2-methyl-3,4-dihydro-2H-pyrrole-1-oxide free radical); 5-(2,2-dimethyl-1,3-propoxy cyclophosphoryl)-5-methyl-1-pyrroline N-oxide free radical; and mixtures thereof.

Embodiments of the dual-cure composition of the present invention may further comprise additional unsaturated materials that may be used to adjust the final viscosity.

Embodiments of the dual-cure composition of the present invention may also comprise one or more additives, such as fillers, impact modifiers, antifoaming agents, mold release agents, lubricants, thixotropes, antioxidants, UV absorbers, heat stabilizers, flame retardants, pigments, colorants, non-fibrous reinforcements and fillers, plasticizers, impact modifiers such as ionomers or maleated elastomers, and other such customary ingredients and additives. One preferred additive is an antifoaming agent such as, for example, the silicon defoamer TEGO® AIREX 980 or 944 by Evonik Industries AG.

Another embodiment of the present invention is a process for the production of a dual-cure composition comprising:

homogenizing a pre-polymer composition comprising components (A), (B), (C), optionally (G), and optionally (H);

heating the pre-polymer composition to a temperature above the Tg of component (B);

cooling the heated pre-polymer composition to a temperature of less than 110° C.; and mixing components (D) and (E) into the cooled pre-polymer composition to form a dual-cure composition.

Another embodiment of the present invention is a process for the production of a dual-cure composite comprising the additional step of:

(v) curing the dual-cure composition as listed above at a temperature of from 80° C. to 130° C. for a period of time sufficient to form a cured composite.

In additional embodiments of the process for production of a dual-cure composition and production of a dual-cure composite, the cooling at step (iii) may be reduced to a temperature below 110° C. For example, the composition may be cooled to a temperature comparable to the $T_g$ of component (B) or to a temperature below the $T_g$ of component (B). Preferably, the composition may be cooled to a temperature of less than 100° C., and more preferably to a temperature of less than 85° C.

A further embodiment of the present invention is a prepreg material comprising (i) at least one fibrous material support, and (ii) the aforementioned dual-cure composition. Embodiments of the prepreg material may use all types of fibrous material support or other reinforcing materials commonly used in the art for these applications. It is also possible for a roving bundle or tow to be shaped before being impregnated, for example to be flattened to a tape, or for the reinforcing fiber to be used as a cloth. Useful fibrous material supports include, without limitation, glass fibers, carbon fibers, graphite fibers, polymeric fibers including aramid fibers, boron filaments, ceramic fibers, polyester fibers, polyethylene fibers, polyoxazoline fibers, metal fibers, asbestos fibers, beryllium fibers, silica fibers, silicon carbide fibers, natural fibers, and so on. Hybrid compositions of the aforementioned fibers may be used in the prepregs and composites of the present invention. Furthermore, the fibers may be selected for specific unique characteristics beyond strength such as, for example, the fibers may be conductive. Conductive fibers, for example conductive carbon fibers or metal fibers, may be used to produce articles for conductive or static charge dissipative applications or EMI shielding.

Glass fibers, which are very common in the art, are available in a number of different kinds, including E-glass, ECR-glass (a modified E-glass that is chemically resistant), R-glass, S-glass and S-2 glass, C-glass, M-glass, AP-glass and hollow glass fibers.

The fiber filaments are usually formed into a bundle, called a roving or tow, of a given uniform cross-sectional dimension. The fibers of the bundle are usually all of the same type, although this is not essential to the present invention. For a particular matrix composition, a fibrous material support should be chosen that can withstand the temperatures and shear suitable for producing the desired prepreg. In particular, if a fiber is coated with a sizing or finishing material, the material should be one that is stable and remains on the fiber at the selected processing temperature. A sizing or finishing material, if employed, may be selected and applied according to customary means. Unsized fibers such as carbon are advantageously employed in some applications in order to optimize mechanical properties.

Another embodiment of the present invention is a process for producing a prepreg material comprising:

homogenizing a pre-polymer composition comprising components (A), (B), (C), optionally (G), and optionally (H);

heating the pre-polymer composition to a temperature above the Tg of component (B);

cooling the heated pre-polymer composition to a temperature of less than 110° C.;

mixing components (D) and (E) into the cooled pre-polymer composition to form a dual-cure composition; and adding to said prepolymer composition during and/or after step (i) component (F), which is a fibrous support material.

In additional embodiments of the process for production of a prepreg material, the cooling at step (iii) may be reduced to a temperature below 110° C. For example, the composition may be cooled to a temperature comparable to the $T_g$ of component (B) or to a temperature below the $T_g$ of component (B). Preferably, the composition may be cooled to a temperature of less than 100° C., and more preferably to a temperature of less than 85° C.

Another embodiment of the present invention is a process for producing a composite from a prepreg material, the process comprising the additional step of:

(vi) curing the prepreg material at a temperature of from 80° C. to 130° C. for a period of time sufficient to form a cured composite.

In the production of the prepreg, the fiber bundle, mat, cloth, or other fibrous support material is heated to a selected temperature above the melting point, softening point, or glass transition temperature (Tg) of the impregnating resin matrix composition. In many cases, this heating is achieved by heating the rollers or other equipment used to convey the fibrous support material. The temperature to which the fibrous reinforcing material is heated may be sufficient to produce a prepreg having no voids or substantially no voids. The temperature to which the fibrous reinforcing material is heated thus may be sufficient to cause the impregnating resin to fully or substantially fully wet out the fibrous reinforcing material.

The means for heating the fiber is not generally critical, and may be chosen from any number of means generally available for heating materials. Particular examples of such means include, without limitation, radiant heat, inductive heating, infrared tunnels, or heating in an oven or furnace, e.g. an electric or gas forced air oven. Insufficient heating may result in undesirable resin conglomeration at the surface of the roving bundle, tow, or other reinforcement. Thus, the temperature to which the roving bundle is heated should be sufficient to allow the resin to flow between the filaments or fibers to impregnate the roving or tow in a substantially uniform way.

The methods for producing a prepreg material of the present invention allow the pre-polymer composition or matrix to impregnate the fiber bundle instead of agglomerating at the surface of the fiber bundle. The particular temperature chosen will depend upon factors that would be obvious to the person of skill in the art, such as the particular type of resin used, the denier of the fiber, and the profile or size of the bundle and can be optimized by straightforward testing according to the ultimate application method. Preferably, the reinforcing material is heated above the temperature of the impregnating matrix composition.

In the formation of a prepreg material, the dual-cure composition (matrix) may be suitable for both hot melt fiber impregnation to form either a fully or partially impregnated prepreg with appropriate tack and handling properties and or casting as a separate resin film which can be combined with one or more dry fabrics to form a prepreg where the resin will flow during subsequent processing to form a fully impregnated laminate.

EXAMPLES

The instant process is illustrated, but in no way restricted, by the following examples in which the quantities quoted represent parts by weight or percentages by weight, unless otherwise stated.

Example 1

Testing of the Mix Ratios for Components (A), (B) and (C)

TABLE 1

| Material | Component | Description | Supplier |
|---|---|---|---|
| Sartomer CN151 | A | methacrylated diglycidyl ether of Bisphenol A | Sartomer Company (Exton, PA) |
| CRELAN ® EF 403 | B | cycloaliphatic polyuretdione | Bayer MaterialScience LLC (Pittsburgh, PA) |
| Sartomer SR540 | C | ethoxylated bisphenol A dimethacrylate | Sartomer Company (Exton, PA) |
| | D | Zinc acetoacetonate | |
| | E | dicumyl peroxide | |

Preparation of the Dual-Cure Composition

This example illustrates the preparation of an exemplary dual-cure composition comprising various mix ratios of component (A)+(B) with component (C). Identities of such components according to embodiments of the present invention are listed in Table 1. 350 g of a mixture containing 35%, 47.5%, 60%, 72.5%, 74.5%, and 85% of component (A)+(B) relative to component (C) was put into a cup and mixed in a Flacktek spin mixer, first at 2700 rpm for ten minutes and then at 3300 rpm for five minutes. Free catalyst [component (D)+component (E)] was added to a final of 1% each by weight and the mixture was spun at 3300 rpm for an additional five minutes.

Testing

Samples were taken for analysis following (1) ASTM D3418-08: Standard Test Method for Transition Temperatures and Enthalpies of Fusion and Crystallization of Polymers by Differential Scanning calorimetry (DSC); (2) ASTM D638-10: Standard Test Method for Tensile Properties of Plastics; and (3) ASTM D4473-08: ASTM D4473-08 Standard Test Method for Plastics: Dynamic Mechanical Properties: Cure Behavior.

TABLE 2

Results of DSC analysis

| % A + B | Initial $T_g$ (° C.) | Enthalpy (J/g) | Final $T_g$ (° C.) |
|---|---|---|---|
| 35 | −35.33 ± 0.67 | 99.88 ± 24.82 | 56.24 ± 0.32 |
| 47.5 | −28.47 ± 0.93 | 92.01 ± 3.05 | 57.83 ± 2.07 |
| 60 | −18.84 ± 0.96 | 76.61 ± 24.23 | 55.43 ± 2.28 |
| 72.5 | −8.72 ± 2.30 | 78.22 ± 16.19 | 56.47 ± 1.34 |
| 85 | 3.82 ± 5.01 | 49.54 ± 6.18 | 55.41 ± 5.90 |

The DSC measurements were taken using a heat profile that included 50° C./minute temperature ramps from a starting temperature of 20° C., down to −50° C., and up to 120° C. where the temperature was maintained for 45 minutes. Table 2 lists values for initial glass transition temperature (initial $T_g$), enthalpy and final glass transition temperature (final $T_g$) which are averages of single measurements from 3 to 4 individual samples. The initial glass transition temperatures (initial $T_g$) of the uncured resin blends at varying compositions demonstrates a linear relationship ($r^2$=0.968): Increased percent component (A)+(B) increases the initial $T_g$.

Beyond demonstrating strength characteristics, the initial $T_g$ may also be helpful in tracking the degradation and long term stability of a resin matrix by retesting a sample at different time periods. A single sample of the 72.5% composition was retested at two-weeks: The initial $T_g$ of the sample was found to be −6.17° C., while the retest two weeks later found an initial $T_g$ of −6.29° C.

As shown in Table 2, the DSC measurements for the dual-cure compositions yielded $T_g$ values that range from about −35 to 4° C. An optimal initial Tg (prior to final cure to form the composite article) of about 0° C. was selected to provide some tackiness to the prepreg material which may aid in formation of the final composite article. For example, some tackiness in the prepreg sheets may help when several sheets are being aligned in or on a mold.

Enthalpy values determined from the DSC analysis show a linear relationship with varied amounts of component (A)+(B) ($r^2$=0.804): Increased percent component (A)+(B) decreases the enthalpy. One might think that this trend is backwards: more crosslinking component (B) should mean that more bonds are formed and thus the enthalpy would increase. However, at a certain point, the amount of crosslinker will be in excess over component (C). Only a certain number of reactions will occur before the only unmatched component left in the dual-cure composition is the crosslinker component (B). The initial rapid increase in enthalpy with increasing proportions of component (A)+(B) has likely already occurred prior to the 35% sample. Furthermore, the dual-cure compositions of the present invention demonstrate much lower enthalpies (50 J/g to 100 J/g) than the prior art resins which typically have enthalpies of 270 J/g or greater.

The final $T_g$ for all of the tested compositions is found to be essentially independent of the proportion of component (A)+(B) in the final dual-cure composition ($r^2$=0.021). Furthermore, the absolute values of the final $T_g$ (50° C. and 60° C.) appear to be rather low and likely represent the $T_g$ of the crosslinking component (B).

Dynamic mechanical analysis (DMA) was used to more accurately determine the final $T_g$. The uncured dual-cure composition prepared above was poured evenly into a preheated mold at 80° C. and placed into a vacuum oven at 80° C. at 30 inches of mercury (in. Hg) for 30 minutes. The sample was then cured at 130° C. for 120 minutes under vacuum, followed by a cool cycle prior to DMA and tensile properties testing. Table 3 lists values for the storage modulus onset temperature, final $T_g$ and Tan Delta Peak temperatures.

TABLE 3

Results of DMA testing

| % A + B | Storage Modulus (° C.) | $T_g$ (° C.) | Tan Delta Peak (° C.) |
|---|---|---|---|
| 35 | 71.3 | 74.2 | 115.7 |
| 35 | 67 | 78.2 | 116.1 |
| 47.5 | 43 | 59.4 | 115.2 |
| 47.5 | 44.3 | 40.1 | 115.2 |
| 60 | 52.6 | 66.8 | 119.9 |
| 72.5 | 57.6 | 53.8 | 113.9 |
| 74.5 | 60 | 61.4 | 108.3 |
| 85 | 63.8 | 64.8 | 109.6 |

There is no overall trend observed in the data collected for the varied percent component (A)+(B) composition. The storage onset modulus temperature is highest for the 35% component (A)+(B) composition, but then drops significantly before starting a steady increase in value for increasing percent component (A)+(B) compositions. The $T_g$ as determined by the loss modulus also seem to be quite random, with no discernible trend apparent. However, the overall average values of these data may be relied upon for comparison purposes. The average storage modulus onset temperature for all the samples is 57.45° C., and the average $T_g$ from loss modulus is 62.34° C. These values are similar to the final $T_g$ obtained by DSC testing, indicating that the data is consistent across different methods of thermal testing. Thus, the average storage modulus onset temperature and the average $T_g$ as determined by DMA are likely representative of the $T_g$ for the crosslinking component (B).

The data in Tables 2 and 3, taken together, indicate that the two transitions observed in the DMA analysis are those of the acrylic component (A) and the uretdione component (B) of the dual-cure composition. While the DSC is only capable of detecting the first transition, corresponding to the uretdione transition at 60° C., the more sensitive DMA analysis detects both the uretdione transition at 60° C. and the acrylic transition at 110° C. It is likely that the two separate transitions observed provide improved impact strength for the final composite component as the cured polymer may have two different relaxation mechanisms. In fact, the lower temperature transition may result in an increased fracture toughness that may convey an increased fatigue resistance. This may be likened to the method by which impact modifiers or tougheners function. A discussion of such is provided in the literature (cf. Gryshchuk et al., Journal of Applied Polymer Science (2002) 84, pp. 672-80) and discussed above.

The tan delta peak temperature data on the other hand is probably the most helpful: The reported final $T_g$ values as measured by the tan delta peak using DMA are likely representative of the final cured material. All values appear to be 110° C. or higher.

FIG. 1 shows viscosity profiles for the varied percent component (A)+(B) compositions. At the pre-cure temperature (above $T_g$ of component (B)), the viscosities of all of the compositions are relatively low, thus providing a matrix material that may demonstrate excellent fiber wet-out properties in a prepreg material.

Table 4 lists values for tensile strength testing. Modulus values and tensile strengths for samples of varied percentage component (A)+(B) compositions appear to decrease with increasing percentage of component (A)+(B).

TABLE 4

Results of tensile strength testing

| % A + B | Trial # | Elongation at break (%) | Elongation at Yield (%) | Modulus (MPa) | Tensile Strength at Break | Tensile Strength at Yield | Ultimate Tensile Strength (MPa) |
|---|---|---|---|---|---|---|---|
| 60 | 1 | 2.1 | 2.1 | 3070 | 60.5 | 60.5 | 60.5 |
|  | 2 | 1.7 | 1.7 | 3140 | 49.6 | 49.6 | 49.6 |
|  | 3 | 2.6 |  | 3060 | 70.3 |  | 70.3 |
|  | 4 | 3.2 | 3.2 | 3220 | 80.2 | 80.2 | 80.2 |
|  | 5 | 3 |  | 3190 | 80.5 |  | 80.5 |
| Average |  | 2.5 | 2.3 | 3136 | 68.2 | 63.4 | 68.2 |
| Std. Dev. |  | 0.6 | 0.8 | 70.9 | 13.3 | 15.5 | 13.3 |
| 72.5 | 1 | 3.5 | 3.5 | 2910 | 82.9 | 82.9 | 82.9 |
|  | 2 | 1.2 | 1.2 | 3160 | 34.5 | 34.5 | 34.5 |
|  | 3 | 2.6 |  | 3050 | 70.1 |  | 70.1 |
|  | 4 | 2.4 |  | 3070 | 66.3 |  | 66.3 |
|  | 5 | 2.5 | 2.5 | 2700 | 63.0 | 63 | 63 |
| Average |  | 2.4 | 2.4 | 2978 | 63.4 | 60.1 | 63.4 |
| Std. Dev. |  | 0.8 | 1.2 | 179.4 | 17.8 | 24.3 | 17.8 |
| 74.5 | 1 | 1.5 | 1.5 | 2640 | 38.1 | 38.1 | 38.1 |
|  | 2 | 1.3 |  | 2670 | 32.7 |  | 32.7 |
|  | 3 | 1.8 | 1.8 | 2690 | 44.6 | 44.6 | 44.6 |
|  | 4 | 1.5 | 1.5 | 2890 | 41.1 | 41.1 | 41.1 |
|  | 5 | 1.9 | 1.9 | 2710 | 48.1 | 48.1 | 48.1 |
| Average |  | 1.6 | 1.7 | 2720 | 40.9 | 43.0 | 40.9 |
| Std. Dev. |  | 0.3 | 0.2 | 98.5 | 5.9 | 4.3 | 5.9 |

Example 2

Testing of Resin Stability

A sample of the dual-cure composition formulated as a prepreg material was stored in the freezer or at room temperature. Viscosity profiles for the two samples were tested after 44 days of storage and the viscosity minimum occurred for both at similar temperatures and viscosities (frozen sample: η=15.873 Pa·s, T=95.7° C.; room temperature sample: η=12.044 Pa·s, T=99.4° C.). Thus, the room temperature storage stability of the dual-cure composition of the present invention is greater than 44 days.

Further DSC testing was performed to determine initial $T_g$ values and reactivity for samples of the dual-cure composition formulated as a prepreg material which were stored in the freezer (with or without desiccant) or at room temperature. DSC heating curves were generated for each storage condition over a month long time course. The DSC method employed for all data presented in Table 5 used approximately 4 mg samples which were encapsulated in vented Al DSC pans with a heating profile as follows: (1) cool to −40° C./hold 10 min to equilibrate; (2) heat to 50° C. @ 5° C./min and hold 5 min; (3) cool to −40° C. @ 10°/min and hold 5 min; (4) heat to 200° C. @ 5° C./min and hold 1 min; (5) cool to −40° C. @ 10° C./min and hold 5 min; and (6) heat to 200° C. @ 10° C./min. The $T_g$ and reactivity data (Table 5) were taken from step 4, which is the first full heating curve to 200° C. The first peak in the bimodal reaction was integrated over the range of 100° C. to 150° C.

There does not appear to be significant variation in the room temperature aged sample as a function of time. Furthermore, the samples aged at room temperature show similar $T_g$ and reactivity profiles as the samples stored frozen with or without desiccant. The room temperature aged sample was analyzed on day 1, 6, 20, and 34, while the samples stored in the freezer were analyzed on day 6 (without desiccant) and on day 33 (with desiccant).

TABLE 5

Results of storage stability testing

| Sample | $T_g$ (° C.) [1] | Cp (J/g° C.) | Trxn (° C.) | ΔHrxn (J/g) |
|---|---|---|---|---|
| Room Temperature Storage |  |  |  |  |
| Day 1 | 5-43 | 0 | 19 | 138 |
| Day 20 | 6-42 | 0 | 19 | 136 |
| Day 20 | 5-44 | 0 | 19 | 136 |
| Day 20 | 4-42 | 0 | 19 | 133 |
| Day 34 | 5-46 | 0 | 20 | 136 |
| Day 34 | 4-42 | 0 | 18 | 136 |
| Day 34 | 4-41 | 0 | 19 | 133 |
| Frozen Storage (without desiccant) |  |  |  |  |
| Day 6 | 4-42 | 0 | 19 | 132 |
| Day 6 | 5-40 | 0 | 22 | 135 |
| Day 6 | 5-46 | 0 | 23 | 134 |
| Frozen Storage (with desiccant) |  |  |  |  |
| Day 33 | 5-46 | 0 | 21 | 135 |
| Day 33 | 5-46 | 0 | 23 | 135 |

Example 3

Testing of Various Components (A)+(B) and Mix Ratios

Table 6 lists values for tensile strength testing on samples of varied percentage component (A)+(B) compositions.

TABLE 6

Results of tensile strength testing

| Description | Shore D Hardness | Flex Modulus (MPa) | Flex Strength (MPa) | Tensile Modulus (MPa) | Tensile Strength (MPa) | Elongation-to-break (%) |
|---|---|---|---|---|---|---|
| Bisphenol A Ethoxylate Diol Vestagon ® 1321* Ratio OH:uretdione - 1.41:1 | 85 | — | — | 2596 | 65.9 | 3.2 |
| Bisphenol A Ethoxylate Diol (B) Crelan ® 403** Ratio OH:uretdione - 1.5:1 | 85 | 2156 | 78.2 | 2336 | 28.8 | 1.4 |
| IBOMA/Desmolux ® 2738/HEMA*** + Polyol 4290† Crelan ® 403 Ratio OH:uretdione - 1.5:1 | 86 | 2423 | 109 | 2356 | 66.8 | 4.1 |
| IBOMA§/Desmolux ® 2738****/HEMA*** + Polyol 4290† Crelan ® 403 Ratio OH:uretdione - 2:1 | 85 | 2578 | 110 | 2784 | 21.4 | 0.9 |
| Desmophen ® 2035‡ Crelan ® 403 Ratio OH:uretdione - 1.5:1 | 78 | 2185 | 76.4 | 2182 | 37.4 | 1.8 |

*Vestagon ® 1321 supplied by Evonik DeGussa, GmbH;
**see Table 1;
†Polyol 4290 supplied by Perstop;
§IBOMA is isobornyl methacrylate;
***Hema is Hydroxyethyl methacrylate;
****Desmolux ® XP 2738 supplied by Bayer MaterialScience LLC;
‡Desmophen ® 2035 supplied by Bayer MaterialScience LLC.

Example 4

Preparation of an Alternative Dual-Cure Composition

This example illustrates the preparation of an exemplary dual-cure composition comprising an alternate component (A), a multifunctional polyol which is a non-free radically reactive oligomer. Identities of each component according to an embodiment of the present invention are listed in Table 7. The mix ratios are illustrated in Table 8.

TABLE 7

| Material | Component | Description | Supplier |
|---|---|---|---|
| Mutranol ® 9133 | A | Low molecular-weight polypropylene oxide-based triol | Bayer MaterialScience LLC (Pittsburgh, PA) |
| CRELAN ® EF 403 | B | cycloaliphatic polyuretdione | Bayer MaterialScience LLC (Pittsburgh, PA) |
| Desmolux ® XP 2738 | C | unsaturated aliphatic allophanate urethane acrylate | Bayer MaterialScience LLC (Pittsburgh, PA) |
| | D | Zinc acetoacetonate | |
| | E | dicumyl peroxide | |

TABLE 8

Dual-Cure Composition

| Raw material | Weight | Volume | Weight solids | Volume solids |
|---|---|---|---|---|
| Multranol 9133 | 11.47 | 1.20 | 11.47 | 1.2 |
| Crelan ® 403 | 123.76 | 13.48 | 123.76 | 13.48 |
| Desmolux ® XP 2738 | 155.59 | 16.21 | 155.59 | 16.21 |
| Zinc aceylacetonate | 6.06 | 0.45 | 6.06 | 0.45 |
| Dicumyl peroxide | 2.29 | 0.18 | 2.29 | 0.18 |
| Tego ® Airex 980 | 0.08 | 0.01 | 0.08 | 0.08 |
| tert-Butyl peroxybenzoate | 0.76 | 0.09 | 0.76 | 0.09 |
| Total | 300 | 31.61 | 300 | 31.61 |

Theoretical Results

| | | | |
|---|---|---|---|
| Weight Solids | 100 | Wt/gal | 9.49 |
| Volume Solids | 100 | Mix ratio (volume) | — |
| P/B | 0 | NCO:OH | 1.86 |
| PVC | 0 | Theoretical VOC | 0 |

Example 5

Testing of Various Mix Ratios of Components (A)+(B)

Table 9 lists values for tensile strength testing on samples of varied percentage component (A)+(B) compositions, where (A) is a Bisphenol A acrylate and (B) is Crelan® 403 (see Table 1).

TABLE 9

Results of tensile strength testing

| Description | Flex Modulus (MPa) | Flex Strength (MPa) | Tensile Modulus (MPa) | Tensile Strength (MPa) | Elongation-to-break (%) | $T_g$ (° C.) |
|---|---|---|---|---|---|---|
| Prior art Hexply M9 Epoxy (literature values) | 3200 | 136 | 3200 | 85 | 4 | >70 |
| Ratio A:B - 1.5:1 (D) ZnAcAc | 1572 | 53 | 1860 | 46 | 12 | 37 |
| Ratio A:B - 1.82:1 (D) ZnAcAc | 1584 | 52 | 1813 | 43 | 5 | 32 |
| Ratio A:B - 2:1 (D) ZnAcAc | 828 | 25 | 1121 | 22 | 50 | 29 |
| Ratio A:B - 1.75:1 + (C) desmolux 2738 (D) ZnAcAc | 1408 | 52 | 4274 | 43 | 2 | 60 |
| Ratio A:B - 1.75:1 + (C) desmolux 2738 (D) TBAA* | 2546 | 97 | 2920 | 42 | 2 | — | tetra-n-butyl ammonium acetate

Example 6

Testing of Various Component (D) Catalysts

Samples of dual-cure compositions according to the present invention were generated using 2-ethyl hexanol (component A)+Crelan® 403 (component B, see Table 1) and several different component (D) catalysts. Each sample was subjected to gel permeation chromatography (GPC) to determine number average molecular weight ($M_n$), weight average molecular weight ($M_w$), Z weight average molecular weight ($M_z$) and the polydispersity index ($M_w/M_n$) (Table 10). Samples which demonstrate a lower molecular weight or a polydispersity index below 2.0 are indicative of urethane formation rather than allophonate formation leading to crosslinking and are thus not good crosslinking catalysts.

TABLE 10

Results of gel permeation chromatography

| Sample | $M_n$ | $M_w$ (S.D.) | $M_z$ (S.D.) | $M_w/M_n$ |
|---|---|---|---|---|
| Crelan ® 403* | 3970 | 9090 | 14690 | 2.29 |
| 0% Blank | 3920 | 8580 | 13930 | 2.19 |
| 1% Zn Acetoacetonate | 3950 | 8760 | 14630 | 2.21 |
| 1% DBU*** | 3160 | 6360 | 10550 | 2.01 |
| 0.5% T-12 + 0.5% DBN**** | 1940 | 3360 | 6040 | 1.73 |
| 1% DBN | 1780 | 2790 | 4540 | 1.57 |

*see Table 1;
**T-12 is dibutyltindilaurate;
***DBU is 1,8-diazabicyclo[5.4.0]undec-7-ene;
DBN is ****1,5-Diazabicyclo(4.3.0)Non-5-Ene It will be appreciated that the aforementioned embodiments and implementations are illustrative and various aspects of the invention may have applicability beyond the specifically described contexts. Furthermore, it is to be understood that these embodiments and implementations are not limited to the particular components, methodologies, or protocols described, as these may vary and may be made without departing from the spirit and scope of the underlying inventive concept. The terminology used in the description is for the purpose of illustrating the particular versions or embodiments only, and is not intended to limit their scope in the present disclosure which will be limited only by the appended claims.

What is claimed is:

1. A dual-cure composition containing:
   (A) a multifunctional polyol;
   (B) a curing agent containing uretdione groups;
   (C) a low viscosity unsaturated reactive diluent;
   (D) at least one reactively activatable catalyst; and
   (E) a thermal crosslinking initiator;
   wherein the composition cures at 80-130° C.

2. The dual-cure composition of claim 1, wherein the heat of polymerization of the dual-cure composition is less than 170 J/g.

3. The dual-cure composition of claim 1, wherein the heat of polymerization of the dual-cure composition is less than 130 J/g.

4. The dual-cure composition of claim 1, further comprising an epoxy functional molecule.

5. The dual-cure composition of claim 1, further comprising a free radical scavenger.

6. The dual-cure composition of claim 5, wherein the free radical scavenger is a nitroxide compound.

7. The dual-cure composition of claim 1, further comprising an antifoaming agent.

8. The dual-cure composition of claim 1, wherein said component (A) is a free radically reactive polyol monomer selected from the group consisting of a vinyl ether, an allyl ether, an acrylate, a methacrylate, a urethane acrylate, allophanate acrylate, epoxy acrylate, alone or in a mixture.

9. The dual-cure composition of claim 1, wherein said component (A) is a non-free radically reactive polyol oligomer selected from the group consisting of an ether, an ester, an epoxy, an alkyd, a urethane, alone or in a mixture.

10. The dual-cure composition of claim 1, wherein said component (B) is selected from the group consisting of isophorone diisocyanate (IPDI) containing uretdione groups, hexamethylene diisocyanate (HDI) containing uretdione groups, diisocyanatodicyclohexylmethane ($H_{12}$MDI) containing uretdione groups, diphenylmethane 4,4'-diisocyanate (MDI) containing uretdione groups, diphenylmethane 2,4'-diisocyanate (MDI) containing uretdione groups, 2,4-toluene diisocyanate (TDI) containing uretdione groups and 2,6-toluene diisocyanate (TDI) containing, uretdione groups.

11. The dual-cure composition of claim 1, wherein said component (C) is a peroxide curable monomer selected from the group consisting of an acrylate, a methacrylate, a urethane acrylate, a urethane methacrylate, a polyester acrylate, a polyester methacrylate, a polyether acrylate, a polyether methacrylate, an allyl ether acrylate, an allyl ether methacrylate, an ester acrylate, an ester methacrylate, an allophonate urethane acrylate, an allophonate urethane methacrylate, an epoxy acrylate, an epoxy methacrylate, a vinyl ether, alone or in a mixture.

12. The dual-cure composition of claim 1, wherein said component (D) is a lewis acid comprising at least one metallo-organic catalyst of the general formula:

$$R_n MeX_y$$

in which
Me is a metal,
R is an alkyl residue,
X is a carboxylate residue, an alcoholate residue, or an acetylacetonate residue,
n=0 or 2, and
y=2 or 3.

13. The dual-cure composition of claim 1, wherein said component (D) is Zn acetylacetonate.

14. The dual-cure composition of claim 1, wherein said component (E) consists essentially of a peroxide or hydroperoxide compound.

15. A dual-cure composition containing:
(A) a free radically reactive polyol monomer selected from the group consisting of a vinyl ether, an allyl ether, an acrylate, a methacrylate, a urethane acrylate, alone or in a mixture:
(B) a curing agent selected from the group consisting of isophorone diisocyanate (IPDI) containing uretdione groups, hexamethylene diisocyanate (HDI) containing uretdione groups, diisocyanatodicyclohexylmethane ($H_{12}$MDI) containing uretdione groups, diphenylmethane 4,4'-diisocyanate (MDI) containing uretdione groups, diphenylmethane 2,4'-diisocyanate (MDI) containing uretdione groups, and 2,4-toluene diisocyanate (TDI) containing uretdione groups, and 2,6-toluene diisocyanate (TDI) containing uretdione groups;
(C) a low viscosity unsaturated reactive diluent selected from the group consisting of a (meth)acrylate, a urethane (meth)acrylate, a polyester (meth)acrylate, a polyether (meth)acrylate, an allyl ether (meth)acrylate, an ester (meth)acrylate, an allophonate urethane (meth)acrylate, an epoxy (meth)acrylate, a vinyl ether, alone or in a mixture;
(D) at least one reactively activatable catalyst comprising a lewis acid containing at least one metallo-organic catalyst of the general formula:

$$R_n MeX_y$$

in winch
Me is a metal,
R is an alkyl residue,
X is a carboxylate residue, an alcoholate residue, or an acetylacetonate residue,
n=0 or 2, and
y=2 or 3;
(E) a thermal crosslinking initiator activatable by actinic radiation;
(F) an acid scavenger; and
(G) acrylate co-catalyst,
wherein the composition cures at 80-130° C.

* * * * *